UNITED STATES PATENT OFFICE.

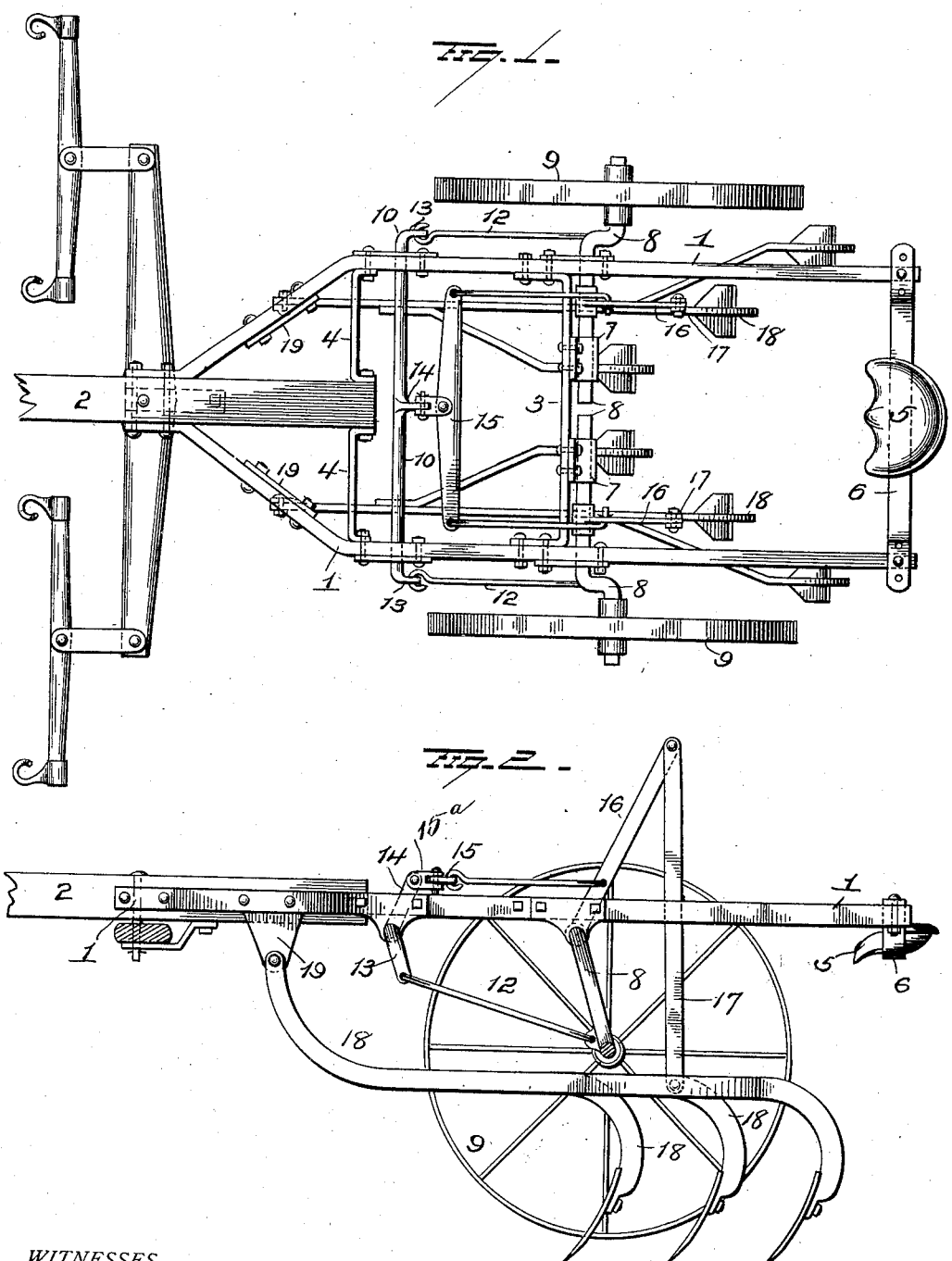

WILLIAM L. PAUL, OF SOUTH BEND, INDIANA, ASSIGNOR TO OLIVER CHILLED PLOW WORKS, OF SOUTH BEND, INDIANA.

CULTIVATOR.

1,059,202.  Specification of Letters Patent.  Patented Apr. 15, 1913.

Application filed September 23, 1912. Serial No. 721,787.

*To all whom it may concern:*

Be it known that I, WILLIAM L. PAUL, a citizen of the United States, residing at South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

My invention relates to an improvement in cultivators of the type known as hammock seat cultivators, the object being to provide a cultivator which will automatically balance, so that when the gangs are raised, the wheels will travel backward, thus shortening the leverage and preventing the weight at the rear end of the frame from carrying the pole up.

With this end in view my invention consists in the parts and combination of parts as will be more fully described and pointed out in the claims.

In the accompanying drawings, Figure 1 is a view in elevation of my improvement and Fig. 2 is a side view of the same.

1 represents the frame comprising parallel side members bent inwardly toward each other at the front so as to engage the opposite sides of the pole 2, to which they are bolted, and connected by the braces 3 and 4, the former of which extends from one side member to the other and is secured to both. The two braces 4 are each secured to one side member at one end, and to the rear end of the pole 2 at the other end, thus rigidly bracing the pole to the frame. The driver's seat 5 is supported at the rear end of the side members of the frame 1 on support 6.

Rigidly secured to the brace 3 are the bearings 7 in which the crank axles 8 are journaled, the two axles being disconnected so as to permit them to move independently. Each axle has a wheel 9, and each is connected with an end of a bail 10 journaled in the side members of the frame 1, by a rod 12. This bail is provided with depending ends 13, to which the two rods 12 are pivotally mounted, and is provided centrally with an upwardly projecting arm 14 to which the evener 15 is pivotally secured at its center through the medium of the link 15ª. This link is connected to the projecting arm 14 of the bail 10 by a horizontal pivot, and the evener is secured centrally to the link by a vertical pivot, so that the evener is free to swing vertically on the horizontal pivot and horizontally on the vertical pivot. This evener terminates at its two ends adjacent the side members of the frame 1, and is connected at its ends to the masts 16, there being one mast for each gang. Each mast is journaled on an axle 8, and each is loosely connected at its upper end with a supporting bar ar pendulum 17, the lower end of each of which is loosely connected with a cultivator gang 18. The two cultivator gangs 18 are pivotally connected to the brackets 19 rigidly secured to the frame 1.

The joints or connections between the gangs and the brackets 19 are loose so as to permit of a laterally swinging movement as well as a vertical movement of the gangs, and the joint or connection between the masts 16 and the supporting bars 17 are also loose for the same purpose. By pushing forwardly on the supporting bars 17, the masts are thrown forwardly and the gangs are elevated above the ground. This relieves the front end of the frame of the drag, and the tendency would be for the weight of the driver at the rear end of the frame to tilt the pole upwardly. To overcome this tendency, I connect the masts with the axles as above described, so that when the masts are thrown forward in a direction to elevate the gangs, the axles will be turned in a direction to carry the wheels to the rear, thus shifting the leverage or the support for the frame, and automatically equalizing or balancing the latter and the parts carried thereby. If only one gang be raised at a time, the evener bar will fulcrum on the rod connecting it to the mast of the other gang and turn and rotate the bail 10 a limited distance only, and thus move the land wheel only half the distance it is moved when both gangs are elevated. If both gangs be elevated, both ends of the evener bar will be moved forwardly thus turning bail 10 its full throw and moving both land wheels the full distance rearwardly.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters Patent, is:—

1. In a cultivator, the combination with a frame, a plurality of gangs pivoted thereto, two crank axles supporting the frame, and a wheel on each axle, of means for elevating either gang independently of the other and balancing devices connecting the gang elevating means and the two axles whereby when either gang is raised both axles will be turned to shift the wheels rearwardly.

2. In a cultivator, the combination with a frame, two crank axles, a wheel on each, two gangs pivoted to the frame in advance of the axles, and a driver's seat carried by the frame in rear of the axles, of gang lifting devices for each gang and balancing devices connecting the two lifting devices and axles, whereby when either gang is lifted the wheels will be shifted rearwardly.

3. In a cultivator, the combination with a frame, two gangs pivoted thereto, two crank axles supporting the frame and a wheel on each axle, of means for elevating the gangs, and equalizing devices connecting the two crank axles and the two elevating devices, whereby when either gang is raised the wheels will be shifted rearwardly, and when both gangs are raised, the movement will be greater than when one only is raised.

4. In a cultivator, the combination with a frame, crank axles and wheels carrying same, two gangs pivoted to the frame in advance of the axles and a driver's seat carried by the frame in rear of the axle, of means for elevating the gangs, each independently of the other, and balancing devices connecting the two elevating means and the two crank axles whereby when either gang is lifted, both wheels will be shifted rearwardly.

5. In a cultivator, the combination with a frame carrying a driver's seat at the rear end, crank axles and wheels on said axles, and two gangs pivoted to the frame in advance of the axles, of a mast for each gang, each mast having a pivot bearing fixed with relation to the frame, a supporting bar for each gang, each supporting bar being loosely connected at its upper end to a mast, a rocking bail connected with both crank axles and with both masts, an evener bar centrally connected to said rocking bail, and rods connecting the ends of the evener bar with the masts.

6. In a cultivator, the combination with a frame, two gangs pivoted thereto near the front, a driver's seat at the rear, two axles journaled in the frame in advance of the seat, and a wheel on each axle, of masts each having a fixed pivot, a supporting bar for each gang, each bar being loosely connected at its upper end to a mast, a rocking bail mounted in the frame and provided at its ends with downwardly projecting arms and at its center with an upwardly projecting arm, a rod connecting each downwardly projecting arm with an axle, an evener bar centrally pivoted to the upwardly projecting arm, and rods connecting the ends of the evener bar with each mast.

In testimony whereof, I have signed this specification in the presence of two subscribing witnesses.

WILLIAM L. PAUL.

Witnesses:
FRANCIS C. NIPPOLD,
EDWIN NICAR.

---

Copies of this patent may be obtained for five cents each, by addressing the "Commissioner of Patents, Washington, D. C."